United States Patent
Brockmann et al.

[11] Patent Number: 6,118,249
[45] Date of Patent: Sep. 12, 2000

[54] CHARGER WITH INDUCTIVE POWER TRANSMISSION FOR BATTERIES IN A MOBILE ELECTRICAL DEVICE

[75] Inventors: Hans-Jürgen Brockmann, Muurla; Heikki Turtiainen, Espoo, both of Finland

[73] Assignee: Perdix Oy, Helsinki, Finland

[21] Appl. No.: 09/375,585

[22] Filed: Aug. 17, 1999

[30] Foreign Application Priority Data

Aug. 19, 1998 [DE] Germany ............... 198 37 675

[51] Int. Cl.⁷ .................................................. H02J 7/00
[52] U.S. Cl. ................................... 320/108; 320/106
[58] Field of Search ............................... 320/106, 108, 320/160, 165, 114

[56] References Cited

U.S. PATENT DOCUMENTS

| | | | |
|---|---|---|---|
| 4,577,148 | 3/1986 | Mullersman | 320/106 |
| 5,548,200 | 8/1996 | Nor et al. | 320/108 |
| 5,572,109 | 11/1996 | Keith | 320/108 |
| 5,734,254 | 3/1998 | Stephens | 320/106 |
| 5,963,012 | 10/1999 | Garcia et al. | 320/106 |
| 6,028,413 | 2/2000 | Brockmann | 320/108 |

FOREIGN PATENT DOCUMENTS

| | | |
|---|---|---|
| 4212041 | 10/1993 | Germany. |
| 19628022 | 1/1998 | Germany. |
| 19741279 | 3/1999 | Germany. |
| 2291291 | 1/1996 | United Kingdom. |

*Primary Examiner*—Peter S. Wong
*Assistant Examiner*—Gregory J Toatley, Jr.
*Attorney, Agent, or Firm*—Ware, Fressola, Van Der Sluys & Adolphson LLP

[57] ABSTRACT

The invention concerns a charger (CU) for batteries (A) in an electrical mobile device (MU), wherein a power oscillator (OSZ) produces an alternating magnetic field with the primary part ($W_{PRI}$) of an inductive coupler, for the inductive transmission of charging power. By alternatingly receiving power for charging the batteries (A), the mobile device (MU) which is coupled to the charger (CU), charges the entire inductive coupler via its secondary coupler part ($W_{SEC}$). The charger (CU) contains detection means (SEL, AMP, RE and FE-DEM) which generate at least one control signal ($S_C 1$, $S_C 2$) when the inductive load of the coupler is periodically changed in order to switch the power level, which is inductively transmitted by the charger (CU) to the mobile device (MU), from a low average value in the stand-by mode to a higher average value for the charging operation.

12 Claims, 3 Drawing Sheets

CHARGER WITH INDUCTIVE POWER TRANSMISSION FOR BATTERIES IN A MOBILE ELECTRICAL DEVICE

TECHNICAL FIELD

The invention concerns a controller for a battery charger in a mobile electrical device, such as for example a mobile telephone, a cordless telephone or similar. The power is inductively transmitted from the charger to the mobile device by means of an alternating magnetic field. The controller detects a connected mobile electrical device which contains a corresponding device for the inductive power transmission and receives the actual charging power. The invention enables an intelligent control of the inductively transmitted power to prevent long downtime and avoid damage caused by inadmissible inductive heating. The invention also concerns the respective installation in the mobile device which operates together with a charger according to the invention. The invention is particularly advantageous for use in compact and light mobile telephones and cordless telephones which are operated by batteries with high energy density.

BACKGROUND OF THE INVENTION

Inductive chargers for mobile telephones are already known. The publication GBA-A-2 291 291 for example concerns a contactless charger with a primary winding which transmits charging power without making direct electrical contact with a secondary winding in a mobile telephone, for charging batteries via a charging rectifier. The primary winding is excited by a power oscillator. In this device the tractive force of the magnetic coupling field apparently produces a problem when the mobile telephone is disconnected from the charger during charging in order to receive calls. To switch off the magnetic coupling field during usage, when a call arrives or when a predetermined key is activated on its keyboard, the mobile telephone sends an IR signal to the charger to stop the power oscillator. This can also be triggered by a mechanical switch located in the charger's housing. The switch can also manually switch the charger on and off An expansion of the solution provides for activating this mechanical switch with the weight of the mobile telephone itself, and to turn the device on by hanging up the mobile telephone. But an automatic switch-off of the power supply when the batteries are sufficiently charged is not provided. Beyond that the charger is also unable to detect whether a mobile telephone has actually turned the device on.

To provide high mobility and continuous utilization of the device, in a mobile telephone, for example, the batteries have a high capacity and must be reenergized in the shortest time by network power or by the on-board power of a vehicle. This requires an extremely light and compact charger that supplies a relatively large amount of power to the mobile device during short charging times, for so-called rapid charges. Due to the compactness of mobile telephones, only small size inductive couplers can be used, which supply the power to the batteries with little loss and a minimum of control effort. In the interest of reliability and ease, the charger and the corresponding mobile device must interact as much as possible as an automatic system. This means the charger must always automatically switch to a stand-by mode when the mobile device is too far away or the batteries are already charged. In the stand-by mode the charger must be able to remain connected to a power source such as the local network or the on-board network of a motor vehicle in an unlimited manner and without creating safety and reliability problems. In that case the device must use a minimum of power and only emit a low magnetic output. This prevents any metallic objects in the vicinity, or a device which is mechanically connected without an inductive coupler or with a charged battery, to heat up to an undesirable degree due to magnetic induction. The charger can only switch on and continuously emit the alternating magnetic field if a device with a corresponding inductive coupler uses actual power to load the alternating magnetic field.

An inductive charger that fulfills these requirements was already described in the old German patent application DE-197 41 279. It stated that a resonance transducer with resonating circuits on both the primary and the secondary side is particularly well suited for an inductive transmission. The resonance transducer is designed as a push-pull power oscillator with a positive capacitive feedback; it can operate with little switching effort under different loads and is distinguished by low interference emissions in the high-frequency range and low power loss. Switching frequencies above 500 kHz can also be obtained without problems, which allows using low volume and low weight U-shaped ferrite cores in the inductive coupler.

Each push-pull branch of the oscillator contains a separate resonance circuit with an inductance that is formed by a primary winding of the coupler. Although both primary windings are located on a common core, they are physically separated from each other so that each one produces an alternating magnetic field in a different space which can be separately influenced. Because of the separate primary windings, the resonating circuits of the push-pull branches have low magnetic coupling and therefore react differently when the spaces are subjected to unequal loads.

Since foreign bodies cause unequal loads as a rule, they can be detected in the primary circuit by means of differences in the predetermined current and voltage values between the push-pull branches. For that reason a control circuit in the charger detects both differences and changes in the oscillator's power consumption and thus detects different loads in the secondary part of the alternating magnetic field such as full load, no load and faulty load due to a foreign body, and reduces the power supply or switches it off.

However, practical embodiments of the solution have shown that a precise construction of the coupler windings is difficult due to the low number of windings and the small U-cores. Therefore different voltage and current values occur in spite of equal secondary loads in the push-pull branches, so that the detection proposed in the patent application DE-197 41 279 is unsatisfactory without an adjustment of the symmetry and does not reliably detect a connected device.

SUMMARY OF THE INVENTION

Starting with the indicated defect, the object of the invention is to create a solution which very reliably and by simple means detects a corresponding connected mobile device and the charge condition of the batteries, in order to switch from a stand-by mode with reduced power transmission to a charging mode with full power transmission.

To attain this objective the charger contains detection means which generate at least one control signal with a periodic change of the inductive power consumption by the mobile device as a function of a frequency, in order to switch the power, which the charger inductively transmits to the mobile device, from the stand-by mode to a charging mode with full power output.

The mobile device periodically changes the current that flows from the secondary part of an inductive coupler to the batteries, independently of the power oscillator's frequency, so that the coupler's charge and thus its power consumption alternate accordingly. This can simply be done with a secondary electronic switch such as a power-FET, which is located to advantage in the high-frequency AC branch between the secondary coupler part and the charging rectifier. A pulsating control voltage periodically connects the secondary coupler part with the charging rectifier, so that the load of the entire coupler alternates between no load and full load. Advantageously the load change takes place with a cycle duration which on the one hand is below the oscillating frequency of the power oscillator. This alternately changes the load of the alternating magnetic field for the respective duration of several periodic oscillations. The actual power is thus obtained in oscillation packets, so-called bursts. On the other hand the duration of the cycle is chosen to be sufficiently short so that the sequence of the oscillation packets can easily by identified as an alternating signal.

The alternating load causes corresponding changes in the mutual inductance of the primary part of the inductive coupler. In a power oscillator which is designed as a self-oscillating power stage for example, this periodically changes different electrical operating values such as power consumption, the oscillator's frequency and the switching phase, as a function of the load changes. By means of selection and acquisition of the periodic load changes, a single or several connected indicators make it possible for the charger to reliably detect a correspondingly connected mobile device. Neither foreign bodies nor devices without a secondary coupling part bring about an alternating load.

The power oscillator is advantageously designed as a resonance transducer, particularly as a push-pull power oscillator with positive capacitive feedback, as described for example in the DE-197 41 279 application. This has two significant advantages:

On the one hand a self-oscillating power stage follows the alternating load on the secondary side without any power losses or problems. Not only does a load-dependent amplitude modulation take place in the power stage, but also an easily detectable frequency and phase modulation occurs.

On the other hand, because of the high oscillating frequency at which a resonance transducer can operate, a good distance must be obtained from the secondary switching frequency, namely the burst frequency, at which the load switch-over is performed.

Both characteristics make it possible to simply obtain an AM-, FM- and/or PM-modulated signal component that corresponds to the load modulation in the mobile device. The modulated signal component is available at different points and can be identified in various ways. In the simplest case a modulation of the current amplitude caused by the load change is identified in the power supply of the power oscillator. To that end the operating power is supplied via an impedance and the alternating portion of the voltage in the impedance is amplified. As a function of the modulated signal component, a signal rectifier provides a corresponding control signal which indicates that a corresponding mobile device is connected to the charger. It is a disadvantage however that the impedance, via which the operating power flows to the power oscillator, converts electrical power into heat.

This can be avoided by evaluating an also available dependence of the oscillating frequency or the phase instead of evaluating the load dependence of the power amplitude. These signal components are coupled out of the power oscillator without any power loss. The detection is successfully performed with a known FM demodulator.

An evaluation of the AM-, FM- and/or the PM-modulated signal component makes it possible to detect the charge condition of the batteries in the connected mobile device to a limited degree, in order to reduce the power supply to the charger when the batteries are fully charged. However this presupposes that the batteries are supplied via a charging circuit which interrupts the power supply when the batteries are saturated. Since there are essentially less load changes, an evaluation of a corresponding threshold value on the charger side can also be used to interrupt the continuous production of the alternating magnetic field.

The probability of detecting a coupled device which contains discharged or not fully charged batteries can be increased by including the secondary electronic switch of the mobile device in the control circuit of an electronic switching control. The control circuit stabilizes either the DC voltage or the DC current through periodical on and off switching. This adjusts the duration and/or the frequency of the oscillation packets obtained during the charging, so that a load current with a constant amplitude is always obtained from the inductive coupler during the closing of the secondary switch. However when the batteries are saturated, the charging circuit interrupts the charging operation and no load current worth mentioning flows. The secondary switch remains open during long periods of time so that no corresponding control signal is created on the primary side.

BRIEF DESCRIPTION OF THE DRAWINGS

The invention will be explained in the following by means of an embodiment. The corresponding drawings show.

BEST MODE FOR CARRYING OUT THE INVENTION

Figure 1:
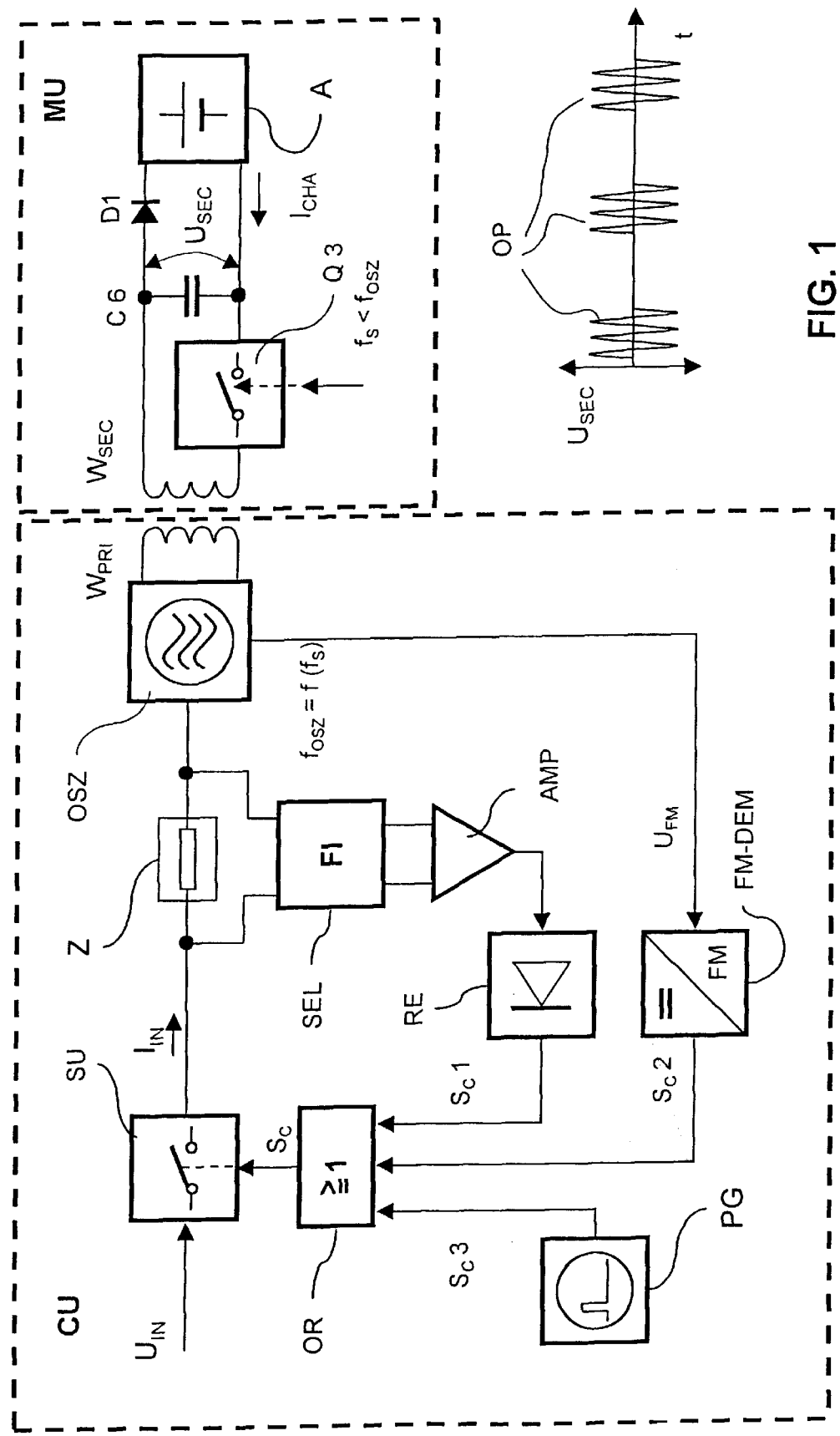
FIG. 1 a charger with a connected mobile device and functional control elements according to the invention.

FIG. 1 illustrates a charger CU with the necessary functional elements and a connected mobile device, in the present case a mobile telephone MU of which only the functional elements required to control the charger CU are shown. The application of the invention presupposes that the charger CU is always connected to a voltage source, such as the local power network or the on-board power network of a motor vehicle. The voltage source always provides an input DC voltage $U_{IN}$ for a power oscillator OSZ with at least one primary winding $W_{PRI}$, which is used as the primary part of an inductive coupler. The supply of the operating power $I_{IN}$ to the power oscillator OSZ can be interrupted with a switching signal $S_C$ from a primary switching unit SU. When the charger CU is supplied by a local network, the switching unit SU can also be a conventional AC/DC converter which can be turned on by the control signal $S_C$ and converts the network AC voltage into the input DC voltage $U_{IN}$. If the control signal $S_C$ has turned the primary switching unit SU on, the power oscillator OSZ oscillates at a frequency $f_{OSZ}$ and the primary part of the inductive coupler generates an alternating magnetic field.

This alternating field reaches the secondary part of the inductive coupler in the mobile telephone MU which is represented by a secondary winding $W_{SEC}$. A secondary switch Q3 and a charging rectifier D1 are connected in series with the secondary part. When the switch Q3 is closed, the alternating magnetic field induces an induction current in the secondary winding $W_{SEC}$. An AC voltage $U_{SEC}$ with the oscillating frequency $f_{OSZ}$ is created at the capacitance C6.

A rectified charging current ICHA is available for charging the batteries A. The secondary switch Q3 is activated with a secondary switching frequency, so that the coupler alternatingly charges the battery. The secondary switching frequency establishes the frequency of the oscillation packets OP in both the mobile telephone MU and in the charger CU. For that reason it is called a burst frequency $f_{BU}$ in the following. The diagram shows the voltage course produced in the capacitance C6 with the periodic activation of the secondary switch Q 3. The oscillation packets OP shown in the diagram correspond to the alternating load of the entire inductive coupler. The operating power $I_{IN}$ for the power oscillator OSZ as well as the oscillating frequency $f_{OSZ}$ change as a function of load.

The changes in the operating power $I_{IN}$ cause a corresponding voltage drop in an impedance Z. The impedance Z can be a simple ohmic resistance, an inductance or a filter and can be placed anywhere in an operating power branch of the power oscillator OSZ. Selection means SEL, such as for example a band-pass filter FI, bring about that essentially only the signal components with the burst frequency $f_{BU}$ are routed to a signal amplifier AMP. A signal rectifier RE obtains a first control signal $S_C$ 1 for an OR-circuit OR from the signal component.

Figure 2:
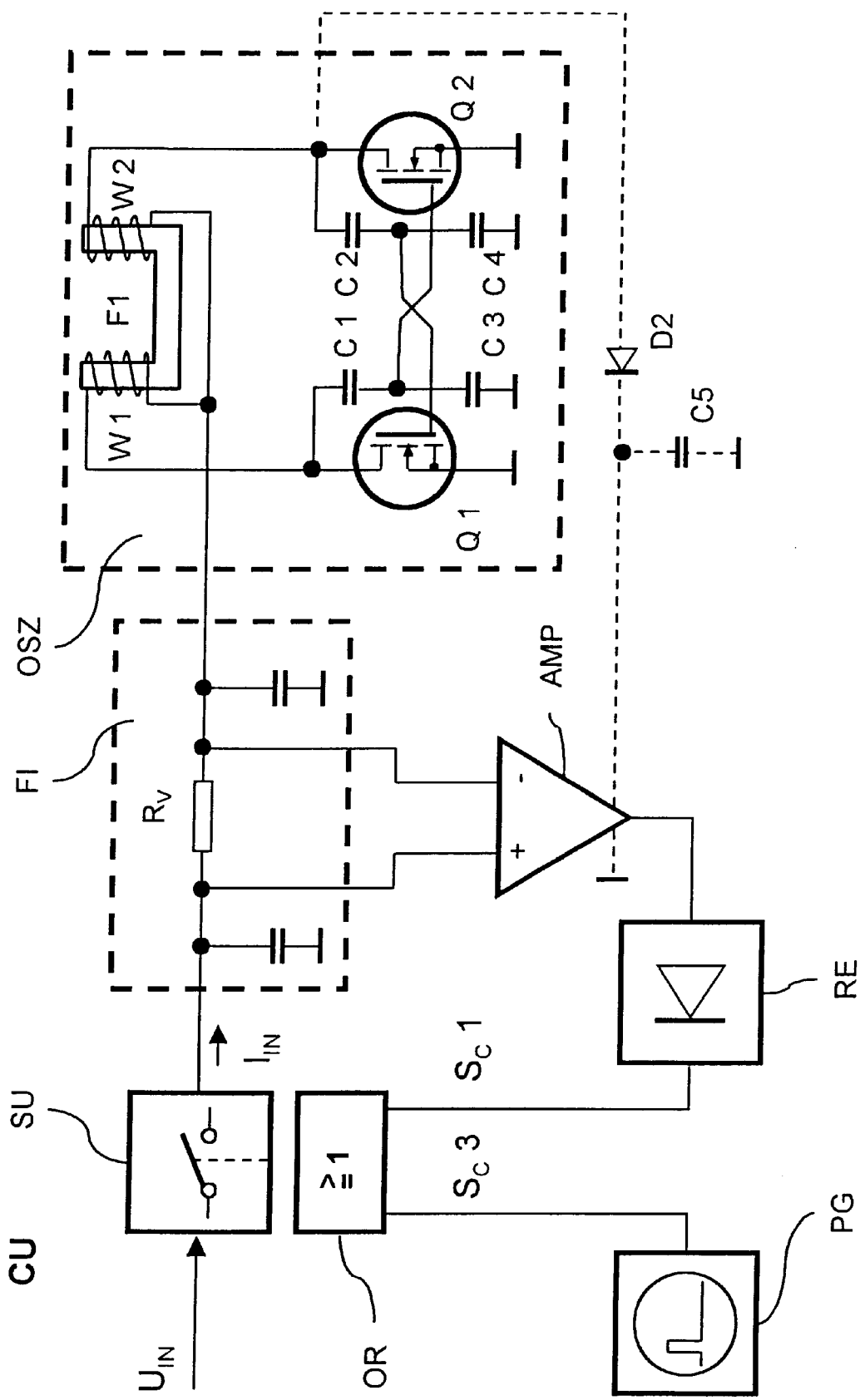
FIG. 2 a detailed illustration of a possible configuration of a charger.

The changes in the oscillating frequency $f_{OSZ}$ can also be picked up at the impedance Z or also directly for example from one or both of the primary switches Q1 or Q2 shown in FIG. 2. A simple frequency discriminator FM-DEM, such as for example a no-inductance PLL (Phase-Locked Loop) circuit produces a second control signal $S_C$ 2. To that end the changing oscillating frequency $f_{OSZ}$ of the resonance transducer OSZ is compared with a reference frequency, for example that of one of the auxiliary oscillators which do not depend on the load changes. In the present case the position and the stability of the reference frequency are of secondary importance. The detection of the load changes in the mobile device is already assured by the fact that the PLL circuit generates an AC voltage with the burst frequency $f_{BU}$.

Both control signals $S_C$ 1, $S_C$ 2 show that a mobile telephone MU, which receives a considerable charging current $I_{CHA}$, is connected to the primary winding $W_{PRI}$ of the inductive coupler. In practice it is therefore sufficient to provide only one means for detecting a magnitude that depends on the load change.

The OR-circuit OR is furthermore connected to a pulse generator PG. Independently of the control signals $S_C$ 1, $S_C$ 2, the latter produces a low-frequency pulse sequence $S_C$ 3 to periodically turn on the primary switching unit SU. The pulse sequence $S_C$ 3 is designed so that the primary switching unit SU turns on for an activation period $T_{ON}$ and turns off for a deactivation period $T_{OFF} \gg T_{ON}$. The activation period $T_{ON}$ is chosen to be a multiple of the burst frequency $f_{BU}$, so that the secondary coupler part is charged by several oscillation packets OP during an activation period $T_{ON}$.

The OR-circuit OR is subject to the following operating conditions:

Without a connected mobile telephone MU, the charger CU is in a first low power stand-by condition. The pulse generator PG only switches the power oscillator OSZ on intermittently through the primary switching unit SU for the duration $T_{ON}$, and switches it off for the significantly longer duration $T_{OFF}$. Since no output is obtained from the magnetic coupler, the intermittent operation of the charger and thus the first stand-by mode can be obtained with an average power consumption of about 0.1 Watt. At this low power consumption the charger CU can be connected to the power source for an unlimited time and without any problems.

Once started by the pulse generator PG, the power oscillator OSZ can remain continuously in operation in order to charge the batteries A at full load. This charging operation is only performed by a mobile telephone MU with a secondary winding $W_{SEC}$ that is connected to the charger CU, and discharged or insufficiently charged batteries A. After the power oscillator OSZ is switched on, a charging current $I_{CHA}$ flows through the pulse generator PG and loads the inductive coupler as a function of the burst frequency $f_{BU}$. As shown the alternating load creates the control signals $S_C$ 1 and $S_C$ 2 which keep the primary switching unit SU closed by means of the OR-circuit OR.

With connected mobile devices whose batteries A are at their maximum capacity, the charger CU is in a second stand-by mode. In that case the power oscillator OSZ operates again in the intermittent mode. Since a charging control circuit CC shown in FIG. 3 interrupts the charging current $I_{CHA}$, no load variations take place in the inductive coupler and no control signals $S_C$ 1 and $S_C$ 2 are generated in the charger CU to continuously switch on the power oscillator OSZ. An average output of a few tenths of a Watt is transmitted to the mobile telephone MU for charging, and can be used to sustain the charge.

The charger CU also remains in the second stand-by mode if a metallic or magnetic foreign body erroneously reaches the area of the alternating magnetic field, or a mobile telephone MU without a secondary coupler part is connected. This avoids any unacceptably high heat and the danger of a possible fire.

FIG. 2 shows a special embodiment of the charger CU. For the cited reasons the power oscillator OSZ is designed as a resonance transducer and a push-pull oscillator. Instead of the primary winding $W_{PRI}$, the two windings W1 and W2 which are located on a U-shaped ferrite core F1, form the primary part of the inductive transducer. Each winding forms a resonating circuit in conjunction with capacitances C1 and C3 or C2 and C4. The switches Q1 and Q2 connect the resonating circuits to the operating voltage $U_{IN}$ in the push-pull mode. The resonating circuit capacitances C1 and C3 or C2 and C4 are also used for the positive capacitive feedback. The power oscillator OSZ oscillates in the present example as a function of the secondary load at an oscillating frequency $f_{OSZ}$ in a range of about $500 < f_{OSZ} < 600$ kHz. In the present example the power oscillator OSZ uses the load dependence of the operating power $I_{IN}$ exclusively as a criterion for the detection. A simple RC filter FI with a resistance Rv in the branch of the operating power $I_{IN}$ ensures that the inputs of the signal amplifier AMP essentially receive only voltage changes which are far below the oscillating frequency $f_{OSZ}$ of the power oscillator OSZ. Because of the large frequency gap, this easily separates load changes whose burst frequency $f_{BU}$ is around 20 kHz for example, from the oscillating frequency $f_{OSZ}$. It is an advantage if the signal amplifier AMP is a differential amplifier which only amplifies signals that lie above a threshold value. This achieves by simple means that the control signal $S_C$ 1 only takes place when load changes with the burst frequency $f_{BU}$ actually take place on the secondary side. In the present example the pulse generator PG switches the resonance transducer OSZ on after about one second for a duration of 10 ms $< T_{ON} <$ 15 ms.

Beyond that FIG. 2 shows by means of the diode D2 and the capacitance C5 a simple possibility of obtaining an operating voltage for the signal amplifier AMP. It uses the switching voltage of switches Q1 and Q2, whose peak value is above the input DC voltage $U_{IN}$.

Figure 3:
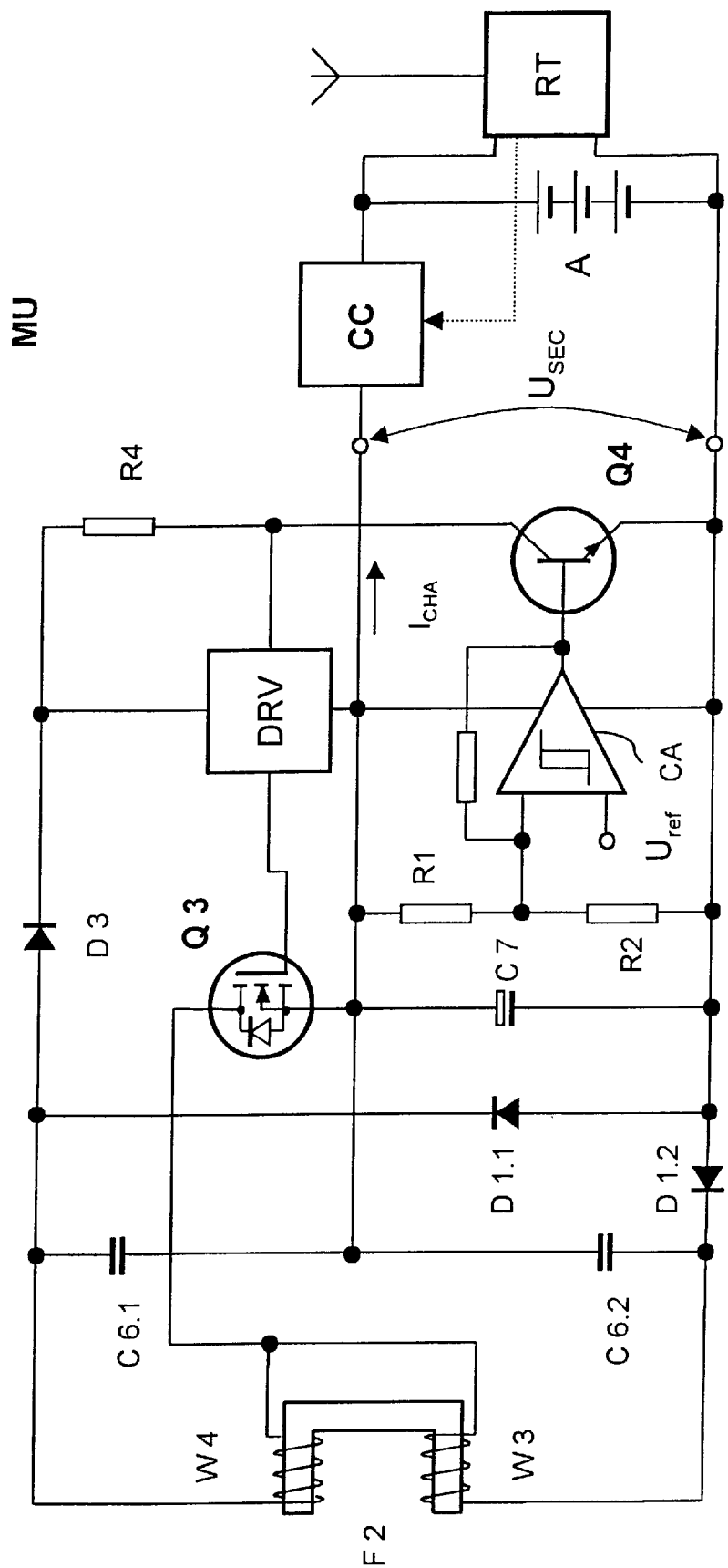
FIG. 3 a possible principle of a circuit diagram in a mobile device for operating a charger according to the invention.

FIG. 3 shows a mobile telephone MU whose other circuit is represented by the block RT. In the special embodiment the secondary electronic switch Q3 is included in the closed loop system of an electronic switching control, which provides a stabilized secondary DC voltage $U_{CHA}$ for charging the batteries A by means of periodic on and off switching via a charging capacitor C7. The DC voltage $U_{CHA}$ supplies the batteries A with charging current $I_{CHA}$ through the charging control circuit CC. Instead of the secondary winding $W_{SEC}$, the windings W3 and W4 form the secondary part of the inductive transducer. Like those in the charger, these are located as much as possible at the ends of a U-shaped ferrite core F2 to provide an effective power transmission. With a capacitance C6.1 or C6.2, each of the windings W3 and W4 forms a resonating circuit which at full load advantageously oscillates at the oscillating frequency $f_{OSZ}$ of the power oscillator OSZ. In the present case the diodes D1.1 and D1.2 form the charging rectifier. The charging control circuit CC controls and monitors the charge of the batteries A. The charging current $I_{CHA}$ continuously unloads the charging capacitor C7 independently of the switching position of switch Q3. A regulating amplifier CA with a hysteresis in the transmission function compares via the voltage divider R1, R2, the direct secondary voltage $U_{CHA}$ with a reference value $U_{REF}$, and if it falls short of a minimum value closes the switch Q3 through the transistor Q4, the resistance R4 and the driver DRV. The alternating magnetic field of the inductive coupler excites the secondary resonating circuits W3//C6.1 and W4//C6.2, and the charging capacitor C7 is charged until an upper limit value is reached. In that case the charging capacitor C7 charges the inductive coupler during an oscillation packet which contains several oscillations of the oscillating frequency $f_{OSZ}$. The coupler then remains unloaded until the charging capacitor's minimum value falls short again. In this way a loss-free load modulation is produced which can be detected by the described means of the charger. By appropriately dimensioning the switching controller, the direct secondary voltage $U_{CHA}$ can be adjusted to be loss-free so that there is a small difference with the final charging voltage of the batteries A. The charging control circuit CC then uses a minimum of electrical power.

The burst frequency $f_{BU}$ can be freely selected within wide limits. To simplify the selection, it should have a corresponding upward distance from the oscillating frequency $f_{OSZ}$, and enough downward distance so that the secondary coupler part is charged by several oscillation packets OP during an activation period $T_{ON}$. To prevent interference with the telephone traffic, the burst frequency $f_{BU}$ should not be in the speech frequency range of telephones. The frequency range of long-wave transmitters can also lead to functional interference. Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. A charger (CU) for batteries (A) in an electrical mobile device (MU) with inductive power transmission, where a power oscillator (OSZ) with a primary part ($W_{PRI}$) of an inductive coupler produces an alternating magnetic field, which is charged via a secondary part ($W_{SEC}$) of the inductive coupler by the mobile device (MU) that is connected to the charger (CU) and consumes power to charge the batteries (A), characterized in that the charger (CU) contains detection means (SEL, AMP, RE and FE-DEM) which generate at least one control signal ($S_C$ 1, $S_C$ 2) by periodically alternating the inductive load of the coupler resulting from the alternating consumption of power by the mobile device (MU) as a function of a burst frequency ($f_{BU}$), to change the power level which is inductively transmitted by the charger (CU) to the mobile device (MU) for the charging operation, from a low average value in the stand-by mode to a higher average value.

2. A charger as claimed in claim 1, characterized by a power oscillator (OSZ) designed as a self-oscillating power stage, so that the electrical operating values, such as the power consumption ($I_{IN}$), the oscillating frequency ($f_{OSZ}$) and the switching phase change respectively as a function of ($f_{BU}$) of the periodic changes in the inductive load.

3. A charger as claimed in claim 2, characterized in that the detection means (SEL, AMP, RE) detect the mobile device (MU) because of modulations in the power consumption ($I_{IN}$) which are caused by the periodic changes in the inductive load.

4. A charger as claimed in claim 2, characterized in that the detection means (FM-DEM) detect the mobile device (MU) because of modulations in the oscillating frequency ($f_{OSZ}$) of the power oscillator (OSZ), which are caused by the periodic changes in the inductive load.

5. A charger as claimed in claim 1, characterized by a pulse generator (PG) for producing a low frequency pulse sequence ($S_C$ 3) to periodically switch on the alternating magnetic field, where the pulse sequence ($S_C$ 3) is designed to turn the alternating magnetic field on for an activation period ($T_{ON}$), and turn it off for a significantly longer deactivation period ($T_{OFF}$), and that the activation period ($T_{ON}$) is several times longer than the duration of a periodic change in the inductive load, so that the inductive coupler is charged several times with oscillation packets (OP) by the secondary part ($W_{SEC}$) during an activation period ($T_{ON}$) of the power oscillator (OSZ).

6. A charger as claimed in claim 5, characterized by an OR-circuit (OR) which forms a switching signal ($S_C$) from the control signal ($S_C$ 1, $S_C$ 2) and the low frequency pulse sequence ($S_C$ 3) generated by at least one of the detection means (SEL, AMP, RE and FE-DEM), which places the power oscillator (OSZ) into the stand-by mode when the periodic inductive load change is missing, and to produce the alternating magnetic field the power oscillator (OSZ) provides only intermittent power to the inductive coupler during the activation period ($T_{ON}$).

7. An electrical mobile device (MU) for operation with a charger as claimed in claim 1, characterized in that charge control means (Q3) are located between the secondary part ($W_{SEC}$) of the inductive coupler and the batteries (A), which periodically change the current flow in the secondary part ($W_{SEC}$) of the inductive coupler, independently of the oscillating frequency ($f_{OSZ}$) of the power oscillator (OSZ), so that the resulting alternating inductive load of the coupler transmits an alternating signal component which corresponds to the charge, via the alternating magnetic field to the primary part ($W_{PRI}$) of the inductive coupler.

8. An electrical mobile device (MU) as claimed in claim 7, characterized in that the charge control means form a secondary electronic switch (Q3) which is included as a control element in a control system that operates the switching circuit to stabilize the DC voltage or the DC current to charge the batteries (A) by alternatingly switching the circuit on and off.

9. An electrical mobile device (MU) as claimed in claim 7, characterized in that the charge control means are located in the high-frequency branch of the AC current between the secondary coupler part and the charging rectifier.

10. An electrical mobile device (MU) as claimed in claim 7, characterized in that an activation of the charge control means takes place at a burst frequency ($f_{BU}$) which is below the oscillating frequency ($f_{OSZ}$) of the power oscillator, so that the inductive coupler is always charged during several periodic oscillations ($f_{OSZ}$).

11. A charger as claimed in claim 1, characterized in that the detection means (SEL, AMP, RE) detect the mobile device (MU) because of modulations in the power consumption ($I_{IN}$) which are caused by the periodic changes in the inductive load.

12. A charger as claimed in claim 1, characterized in that the detection means (FM-DEM) detect the mobile device (MU) because of modulations in the oscillating frequency ($f_{OSZ}$) of the power oscillator (OSZ), which are caused by the periodic changes in the inductive load.

* * * * *